United States Patent
Holroyd et al.

(10) Patent No.: US 10,894,525 B2
(45) Date of Patent: Jan. 19, 2021

(54) SEAT BELT ENERGY MANAGEMENT LOOP

(71) Applicant: Polaris Industries Inc., Medina, MN (US)

(72) Inventors: James A. J. Holroyd, Stillwater, MN (US); Shane W. Marko, Turtle Lake, WI (US); Daniel W. Vogl, Saint Paul, MN (US)

(73) Assignee: Polaris Industries Inc., Medina, MN (US)

( * ) Notice: Subject to any disclaimer, the term of this patent is extended or adjusted under 35 U.S.C. 154(b) by 135 days.

(21) Appl. No.: 16/184,197

(22) Filed: Nov. 8, 2018

(65) Prior Publication Data

US 2020/0148162 A1 May 14, 2020

(51) Int. Cl.
 *B60R 22/24* (2006.01)
 *B60R 22/34* (2006.01)
 *B60R 22/18* (2006.01)

(52) U.S. Cl.
 CPC .............. *B60R 22/24* (2013.01); *B60R 22/34* (2013.01); *B60R 2022/1818* (2013.01)

(58) Field of Classification Search
 CPC ...... B60R 2022/1818; B60R 2022/289; B60R 22/18; B60R 22/19; B60R 22/24; B60R 22/26; B60R 22/28; B60R 22/34
 See application file for complete search history.

(56) References Cited

U.S. PATENT DOCUMENTS

| | | | | |
|---|---|---|---|---|
| 4,033,594 A | * | 7/1977 | Lindblad ................. | B60R 22/24 297/481 |
| 4,373,749 A | * | 2/1983 | Miki ....................... | B60R 22/34 280/807 |
| 4,469,351 A | * | 9/1984 | Matsuoka ............... | B60R 22/04 280/806 |
| 4,607,864 A | * | 8/1986 | Kouketsu .............. | B60R 22/024 280/808 |
| 4,645,234 A | * | 2/1987 | Koide .................... | B60R 22/022 280/808 |
| 4,648,625 A | * | 3/1987 | Lynch ..................... | B60R 22/19 280/808 |
| 5,286,057 A | * | 2/1994 | Forster ................... | B60R 22/19 188/65.1 |
| 5,308,116 A | * | 5/1994 | Zawisa ................. | B60R 22/024 280/808 |
| 6,527,299 B2 | * | 3/2003 | Specht ................ | B60R 22/1951 280/806 |
| 7,118,133 B2 | * | 10/2006 | Bell ....................... | B60R 22/022 280/806 |
| 7,131,669 B2 | * | 11/2006 | Morita ................... | B60R 22/24 280/808 |
| 7,971,908 B2 | * | 7/2011 | Hathaway ............... | B60R 22/26 24/115 F |

(Continued)

*Primary Examiner* — Laura Freedman
(74) *Attorney, Agent, or Firm* — Harness Dickey

(57) ABSTRACT

A seat belt energy management loop system is disclosed. The seat belt energy management loop system reduces off-axis loading on a retractor for a seat belt during side loading of a vehicle. The seat belt energy management loop system includes a triangularly shaped wire loop, a first spacer attached to a first end of the wire loop and a second spacer attached to the second end of the wire loop. A fastener passes through the first and second spacers to attach the wire loop to a vehicle and relative to the seat belt retractor.

20 Claims, 18 Drawing Sheets

(56) References Cited

U.S. PATENT DOCUMENTS

| | | | |
|---|---|---|---|
| 10,196,033 B2 * | 2/2019 | Loew | B60R 22/20 |
| 2020/0130636 A1 * | 4/2020 | Moeker | B60R 22/1952 |
| 2020/0130640 A1 * | 4/2020 | Yamamoto | B60R 22/28 |

* cited by examiner

US 10,894,525 B2

SEAT BELT ENERGY MANAGEMENT LOOP

FIELD

The present disclosure relates to restraint systems, and more particularly, to a seat belt energy management loop employed in a restraint system.

BACKGROUND

This section provides background information related to the present disclosure which is not necessarily prior art.

Restraint systems for vehicles are well known. These restraint systems generally include a seat belt having a seat belt retractor and a latch. The seat belt can be latched and unlatched relative to the vehicle occupant. The retractor can allow the belt to be extended and retracted during latching and unlatching of the vehicle occupant.

During restraint of a vehicle occupant, the seat belt, retractor, and latch are subject to various loads. To carry these loads, the retractor and latch are generally secured to a chassis of the vehicle. In some instances, it may be desirable to share or manage off-axis loads on these components.

SUMMARY

This section provides a general summary of the disclosure, and is not a comprehensive disclosure of its full scope or all of its features.

A seat belt energy management loop system is used for reducing off-axis loading. The system includes a wire loop that extends from a first end to a second end. A first spacer is attached to one of the ends. The wire loop has a seat belt support end opposite the first and second ends. A seat belt guide portion is between the seat belt support end and the first and second ends. A seat belt guide wire segment between the seat belt support end and the seat belt guide portion is used for guiding a seat belt.

The seat belt energy management loop system can include a triangularly shaped wire loop. The triangularly shaped wire loop includes a first end and a second end where the first end is adjacent to the second end. A first spacer is attached to the first end of the wire loop. A second spacer is attached to the second end of the wire loop. A fastener is used to pass through the first and second spacers to attach the wire loop to a vehicle to reduce off-axis loading on a seat belt retractor.

The seat belt energy management loop system can include the triangularly shaped wire loop that has the first end adjacent to the second end. The first end is positioned adjacent to the second end to define a gap between the first and second ends. The triangularly shaped wire loop includes a first wire segment, a second wire segment and a third wire segment where the first wire segment forms a seat belt guide surface. First and second annular spacers are attached to the first and second ends of the wire loop, respectively. A fastener passes through the first and second annular spacers to attach the wire loop to a vehicle to reduce off-axis loading on a seat belt retractor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 11A-10E are top, front, bottom, right side, and left side views, respectively, of the right hand or passenger side energy management loop;

FIGS. 13A-12C are top, front, and side elevational views of the assembly of the energy management loop and spacer for the right hand passenger side.

Corresponding reference numerals indicate corresponding parts throughout the several views of the drawings.

DETAILED DESCRIPTION

Example embodiments will now be described more fully with reference to the accompanying drawings.

Figure 1:
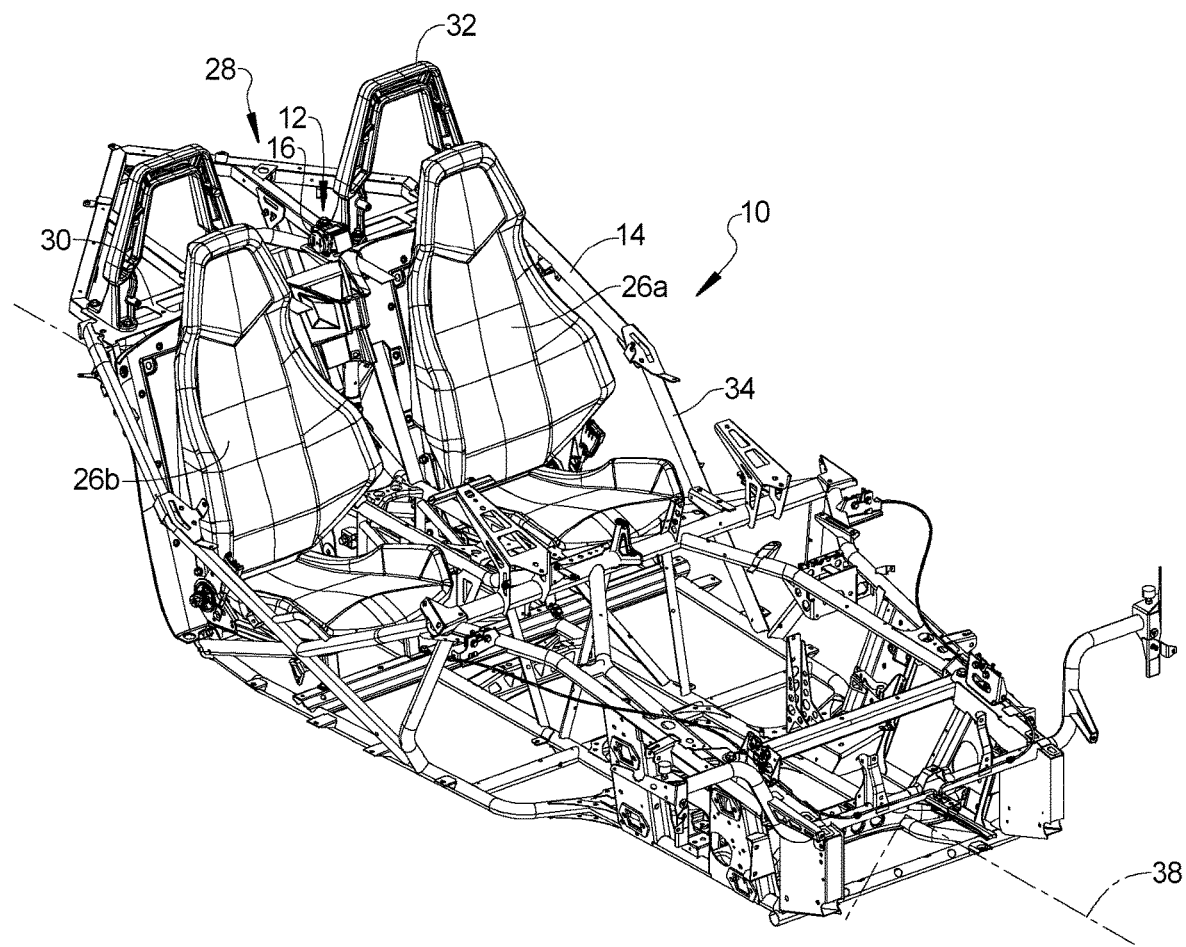
FIG. 1 is a perspective view of a chassis of an exemplary vehicle.
Figure 2:
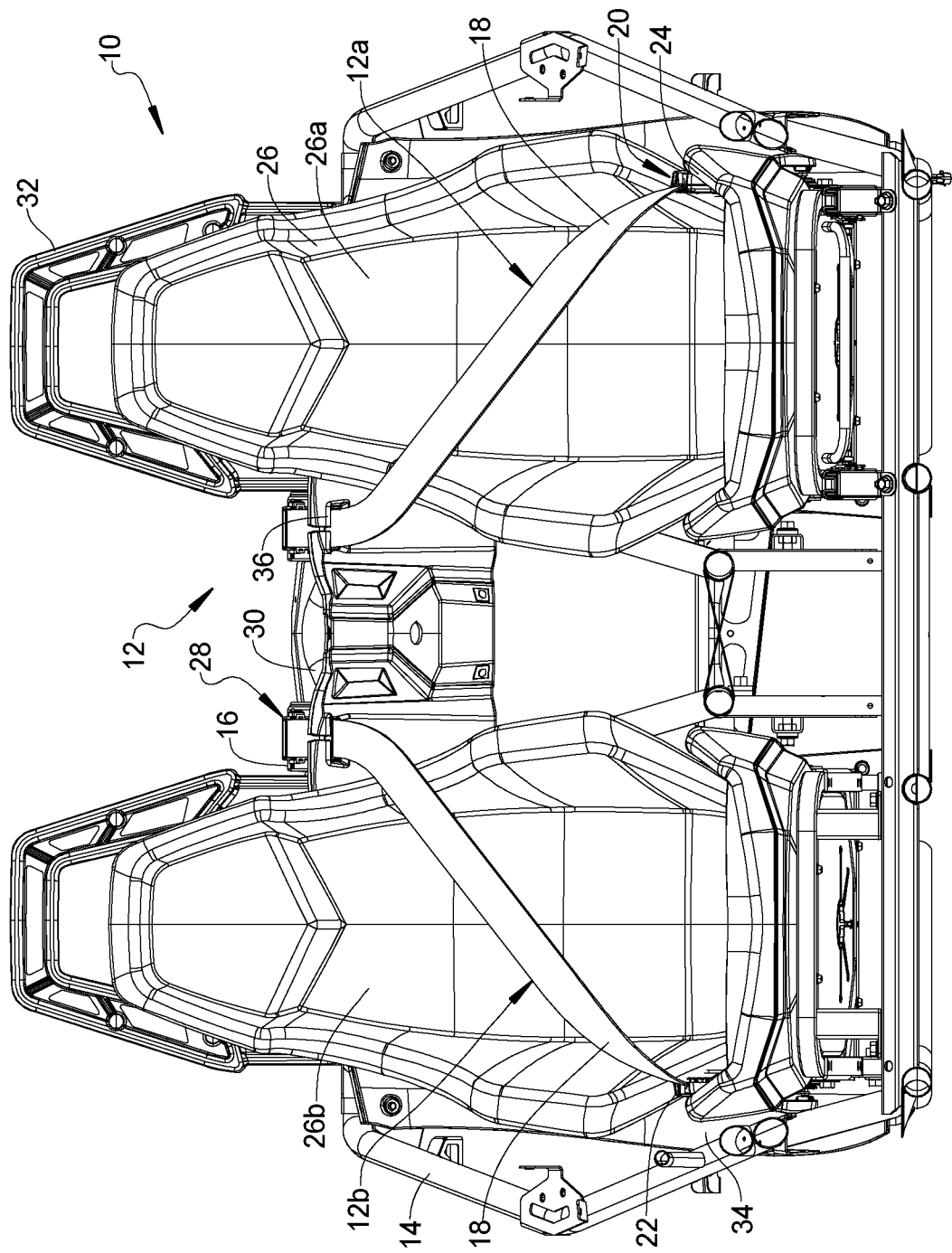
FIG. 2 is a front elevational view of the vehicle of FIG. 1 illustrating the seat belts extended and latched.

Referring to FIGS. 1 and 2, an exemplary vehicle 10 is illustrated that includes a restraint system 12. The restraint system 12 is secured to a chassis 14 of the vehicle 10. The restraint system 12 includes a retractor 16 having a retractable seat belt 18. The retractor 16 is a parcel type top exit retractor that is available through Joyson Safety Systems of Auburn Hills, Mich. Other types of conventional retractors can also be used in the restraint system 12. The restraint system 12 also includes a latch assembly 20 that includes a seat belt latch 22 and a fixed vehicle latch 24, such that the seat belt latch 22 can be latched and unlatched to the vehicle latch 24. The latch assembly 20 is a conventional latch system that is also available through Joyson Safety Systems of Auburn Hills, Mich.

As illustrated in FIGS. 1 and 2, the vehicle 10 having the chassis 14 can include any number of occupant seats 26 to support and retain a vehicle occupant. As illustrated, the vehicle 10 is a two-passenger vehicle having a driver seat 26A and a passenger seat 26B, such as a Polaris Slingshot® vehicle of Medina, Minn. Accordingly, there is a driver restraint system 12A and a passenger restraint system 12B.

Each retractor 16 is secured to the chassis 14 at a first retractor mounting position 28 that is along a rear support frame 30 and adjacent to a pair of roll hoops or bars 32. The latch assembly 20 is coupled to a side support frame 34. The seat belt 18 extends between the retractor 16 and the latch assembly 20 and passes through a T-slot 36. As illustrated in FIG. 1, the vehicle 10 extends along a longitudinal axis 38 and the retractor 16 retracts and extends the seat belt 18 generally along the axis 38. Additionally, forward loading forces on the retractor 16 are also generally along the axis 38.

Turning to FIGS. 3-8, a seat belt energy management loop 40 is illustrated. The energy management loop 40 reduces off-axis loading of the retractor 16 due to side loading transverse to the axis 38. In other words, the energy management loop 40 shares side transverse loads in the restraint system 12. As illustrated, the retractor 16 is secured to the rear support frame 30 by way of a fastener 42, such as a nut and bolt. The energy management loop 40 is attached to the chassis 14 of the vehicle 10 by way of a fastener 44, such as a nut and bolt, at a roll hoop mounting location 46. The roll hoop mounting location 46 is designed for the mounting point of the roll hoop or bar 32 and provides a strong and secure mounting position and location for the energy management loop 40 to sustain large transverse loads.

Figure 9A:
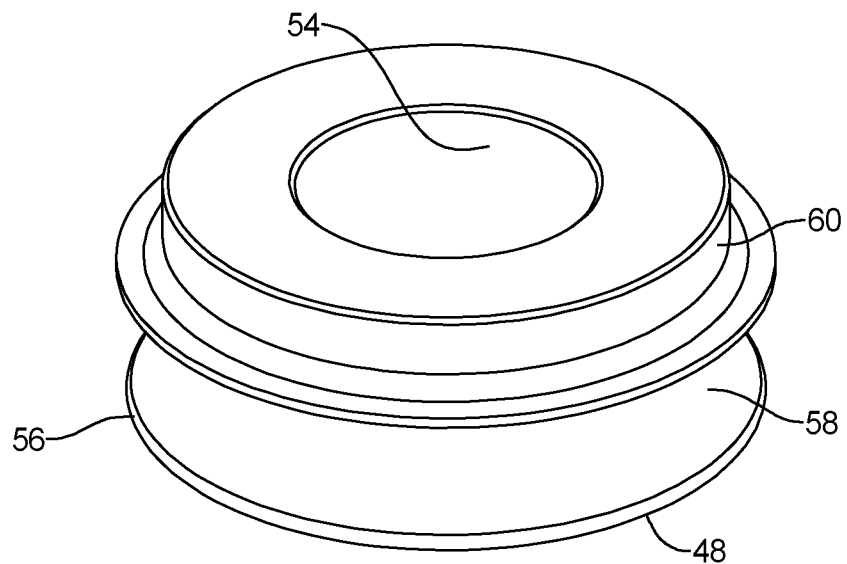
FIG. 9A is a perspective view of the spacer guide for the energy management loop.
Figure 9B:
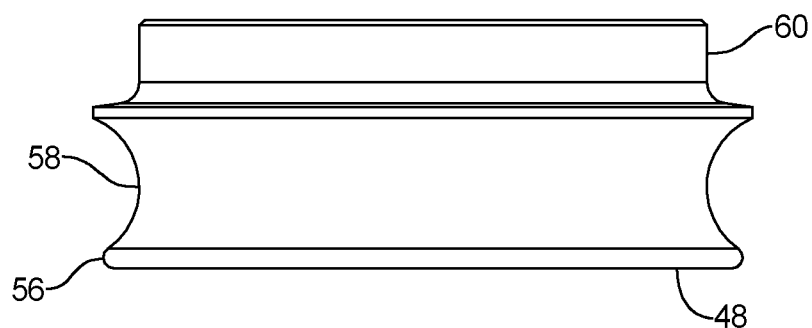
FIG. 9B is a side elevational view of the spacer guide of FIG. 9A.
Figure 12A:
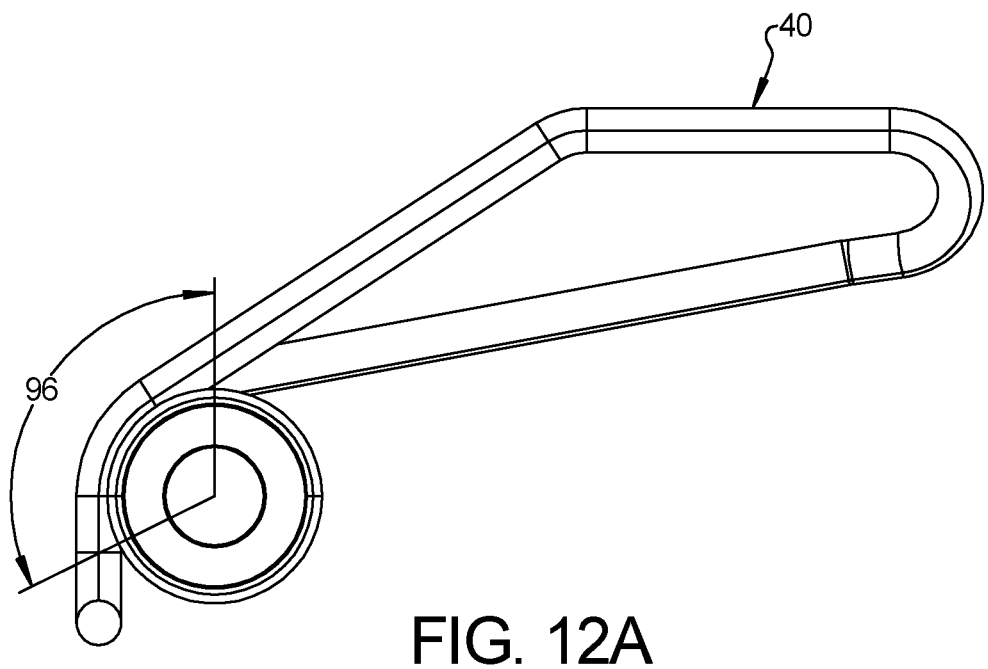
FIGS. 12A-12C are top, front, and side elevational views of the assembly of the energy management loop and spacer for the left hand driver side.
Figure 12B:
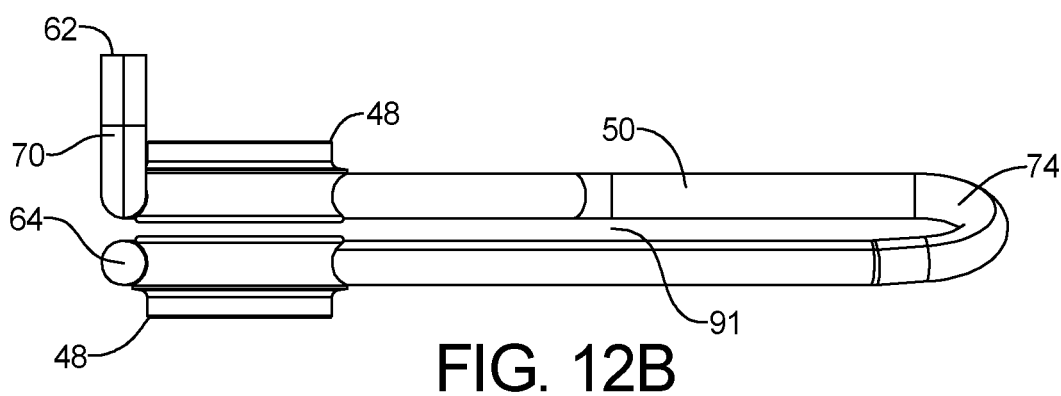
Figure 12C:
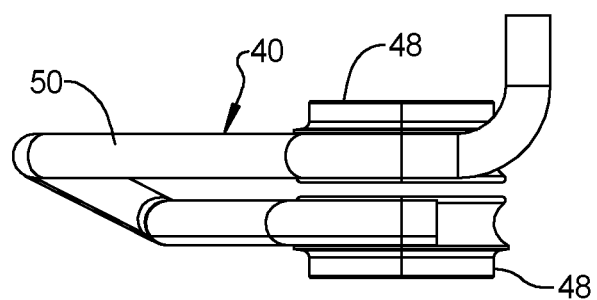
Figure 13A:
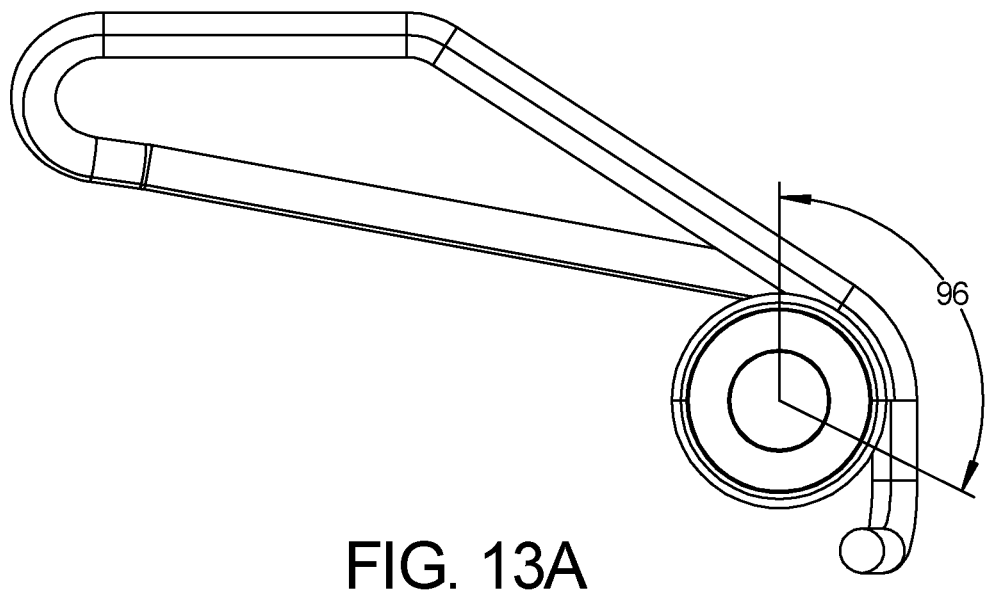
Figure 13B:
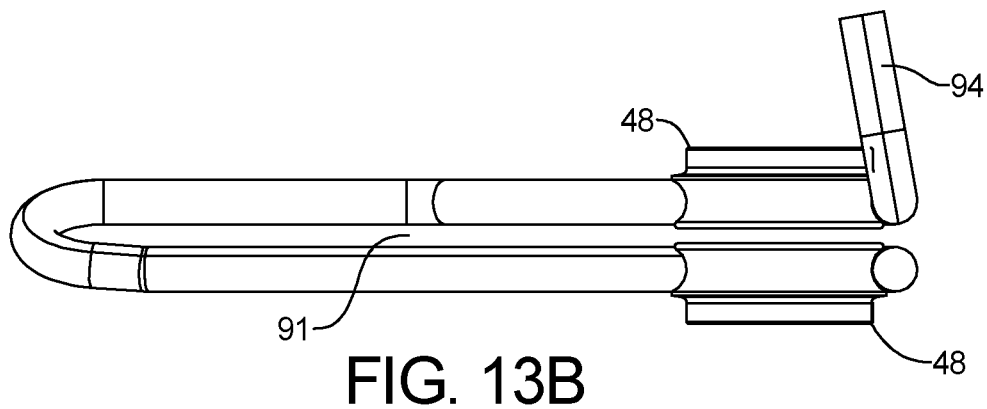
Figure 13C:
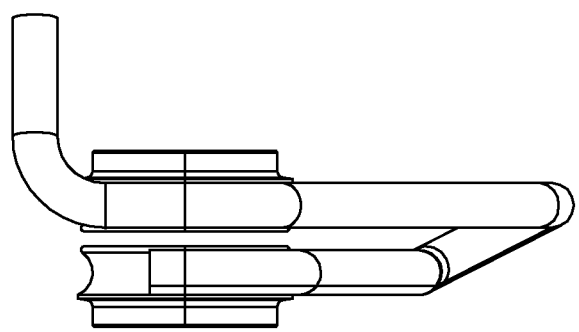

Referring to FIGS. 9A and 9B, a spacer guide 48 for the energy management loop 40 is illustrated. Referring to FIGS. 10A-10E, these figures illustrate a driver side, or left hand side, wire loop 50. Referring to FIGS. 11A-11E, a wire loop 52 for the passenger side, or right hand side, restraint system 12B is illustrated. As illustrated in FIGS. 12A-12C, the energy management loop assembly 40 is shown assembled with both the spacers 48 and the driver wire loop 50. Likewise, FIGS. 13A-13C illustrate the assembled energy management loop 40 having the passenger side wire loop 52 and spacers 48.

Referring specifically to FIGS. 9A and 9B, the spacer 48 is illustrated. As noted in FIGS. 12 and 13, each energy management loop 40 utilizes two spacers 48 that are attached to the ends of the corresponding wire loop further discussed herein. Each spacer 48 defines a central bore 54 that is configured to receive the fastener 44 during mounting of the energy management loop 40 relative to the roll hoop mount 46. The spacer 48 includes an outer circular side wall 56 that includes a grooved portion 58. The grooved portion 58 includes a concave groove substantially hemispherical in shape in a side view and sized to nestingly receive an end of the wired loop 50/52. Positioned adjacent to the grooved portion 58 is a spacer guide portion 60 that is designed to support either the head of a bolt or a nut of fastener 44. The spacer 48 is formed exemplary of 1018 steel or other appropriate strength material.

Referring to FIGS. 10A-10E, the driver wire loop 50 will be further discussed. The driver wire loop 50 is shaped to accommodate both the seat belt 18, as well as two spacers 48. The driver wire loop 50 is substantially similar to the passenger wire loop 52 and is essentially a mirror image except for some minor differences, which will be further discussed herein. Regarding the driver wire loop 50, this wire loop is formed from ¼" diameter 1018 steel so that it is capable of flexing and moving during loading but provides a sufficient load retaining strength. The shape of the wire loop 50 is designed to redirect lateral force that is on the seat belt 18 and retractor 16 during lateral loading of the vehicle 10. The wire loop 50 does this without impeding normal belt movement during daily use and does not impede the forward retention of occupants but improves the strength of the restraint system 12 in off-side or off-axis loading.

Figure 4:
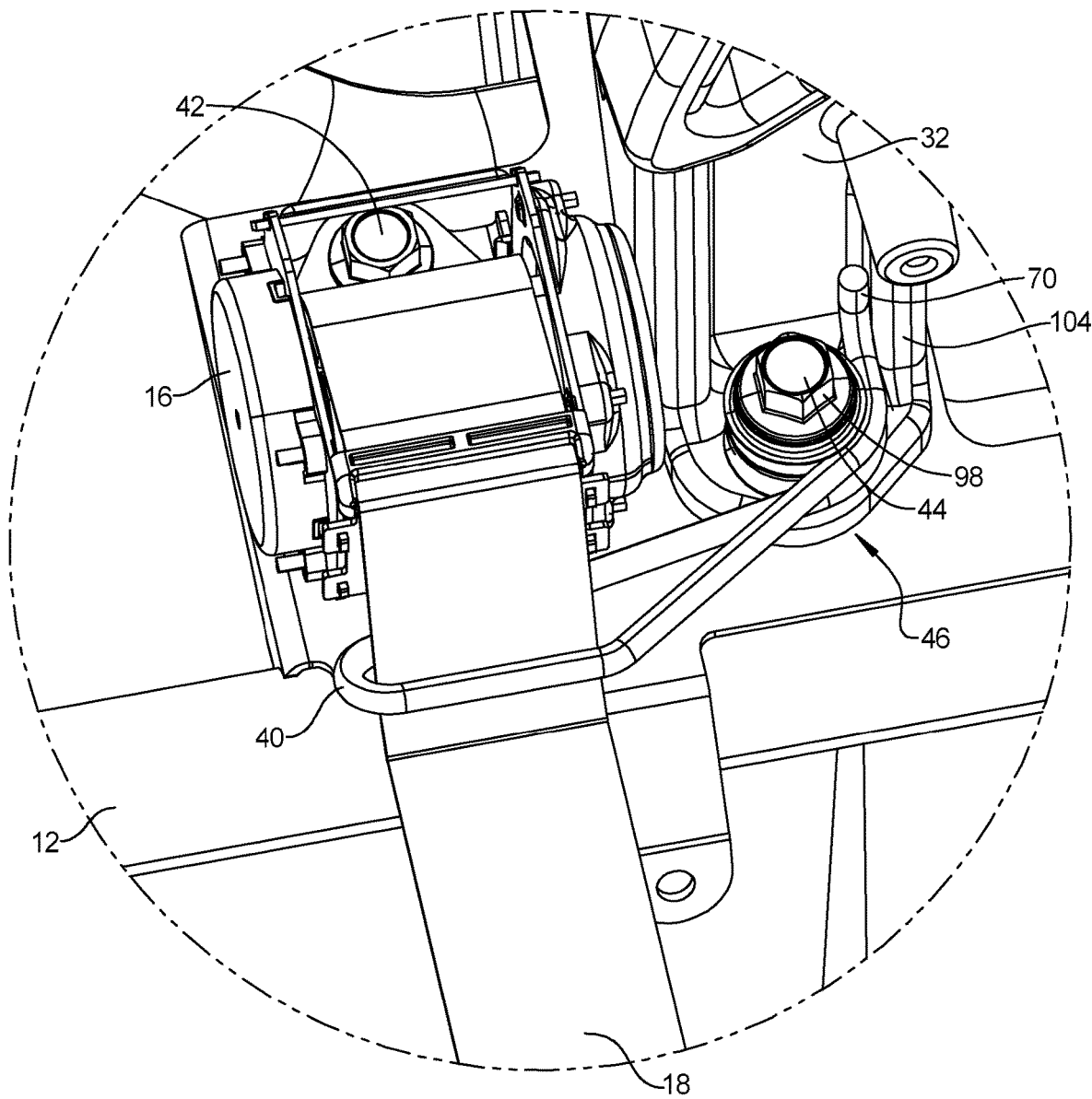
FIG. 4 is a top perspective view of the retractor and the energy management loop affixed to the chassis.
Figure 5A:
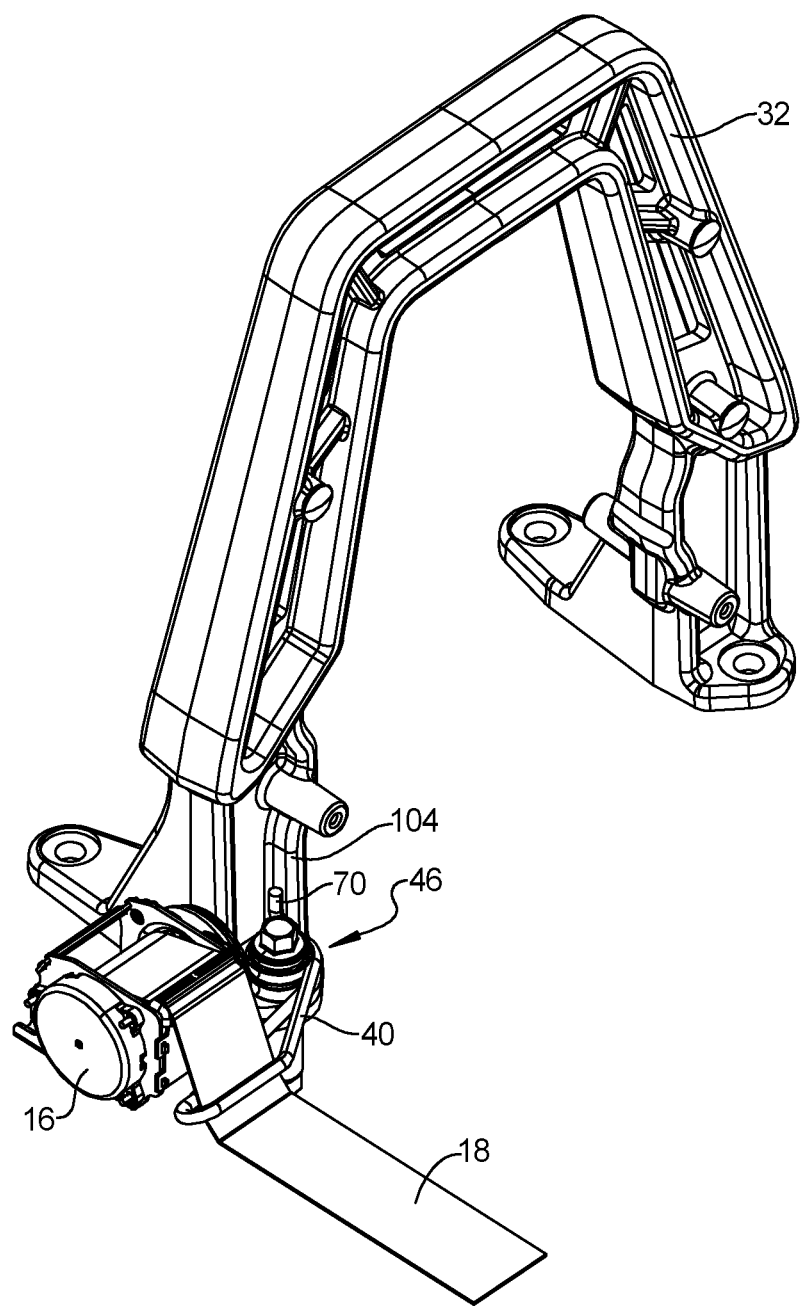
FIG. 5A is a side perspective view of the retractor and the energy management loop affixed to the chassis.
Figure 5B:
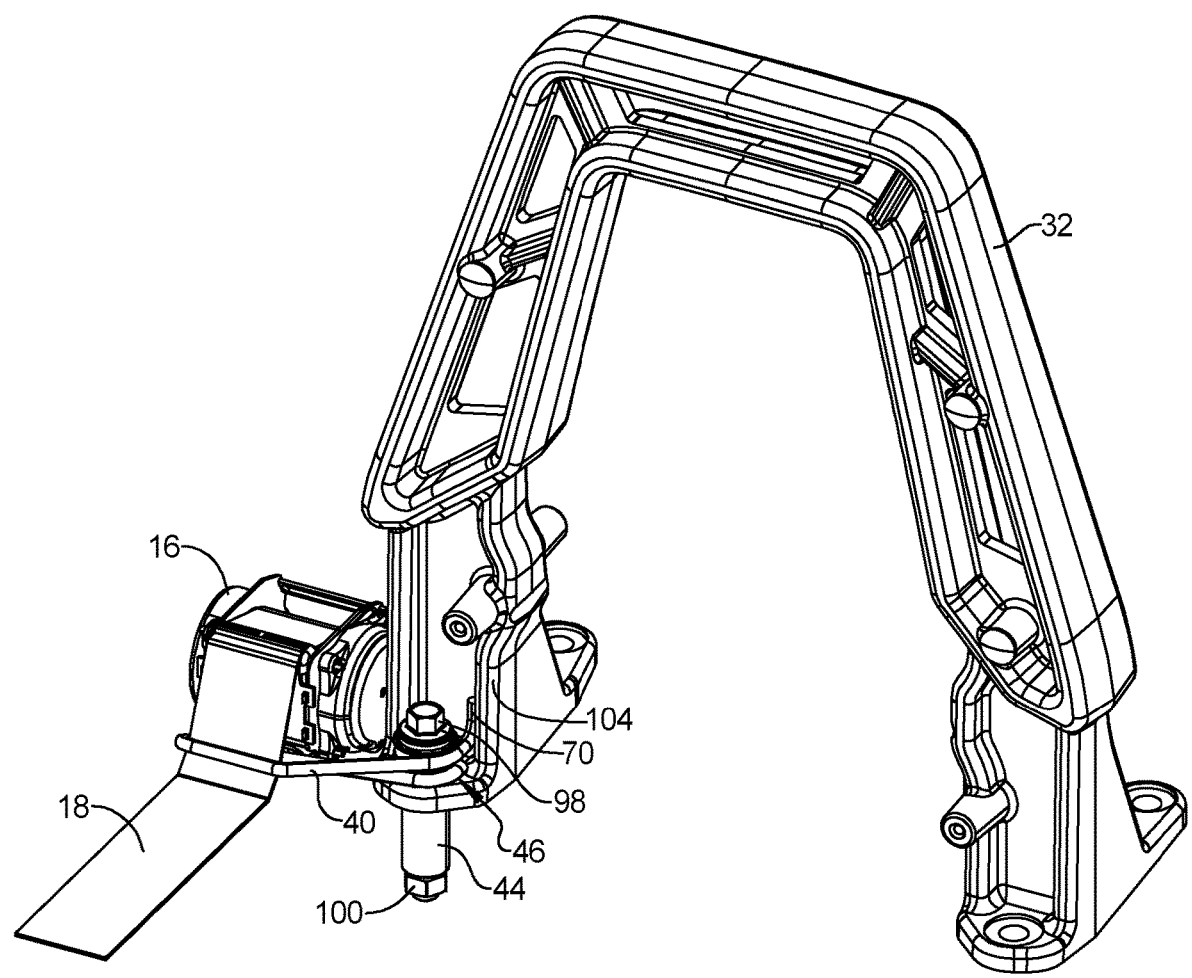
FIG. 5B is another side perspective view of the retractor and the energy management loop.
Figure 6:
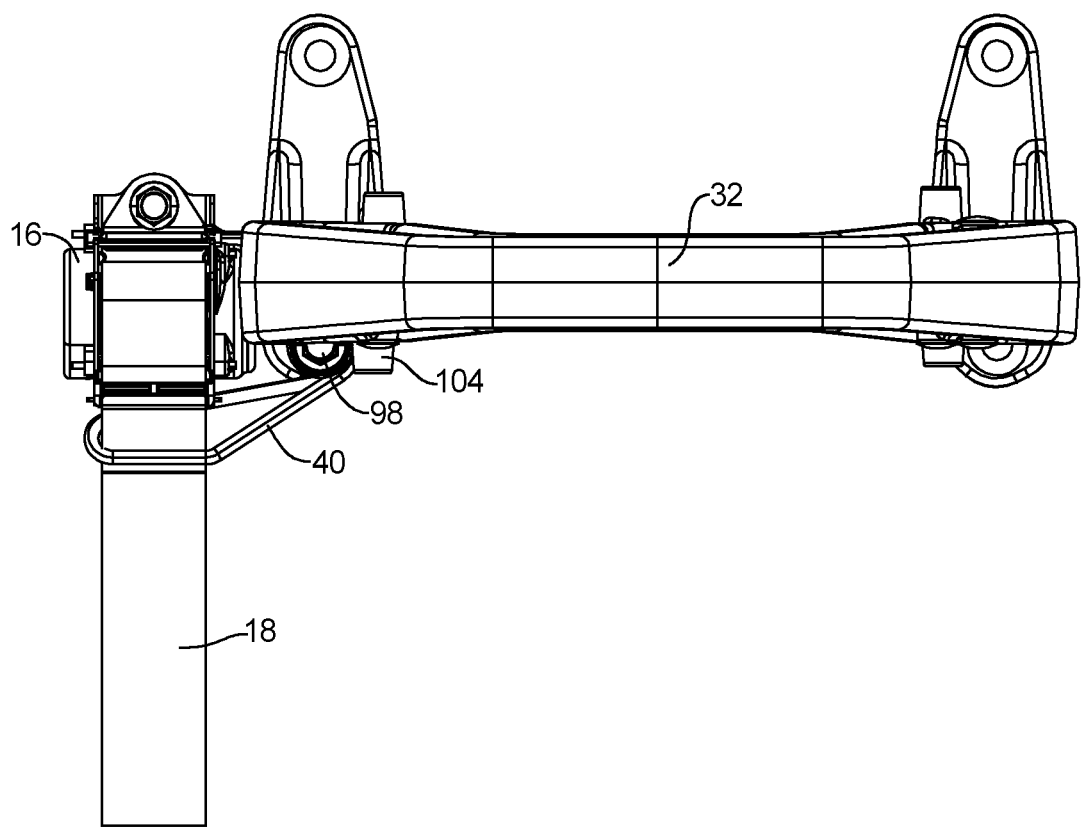
FIG. 6 is a top view of the retractor with the energy management loop.
Figure 7:
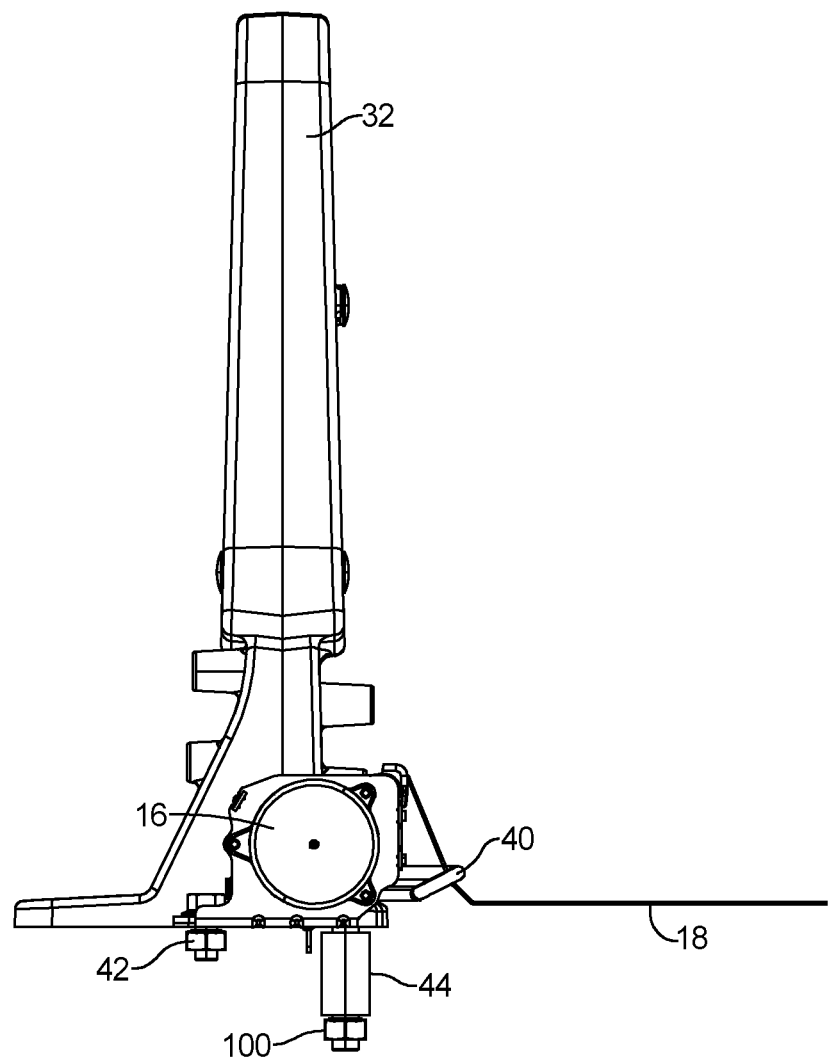
FIG. 7 is a side view of the retractor with the energy management loop.
Figure 10A:
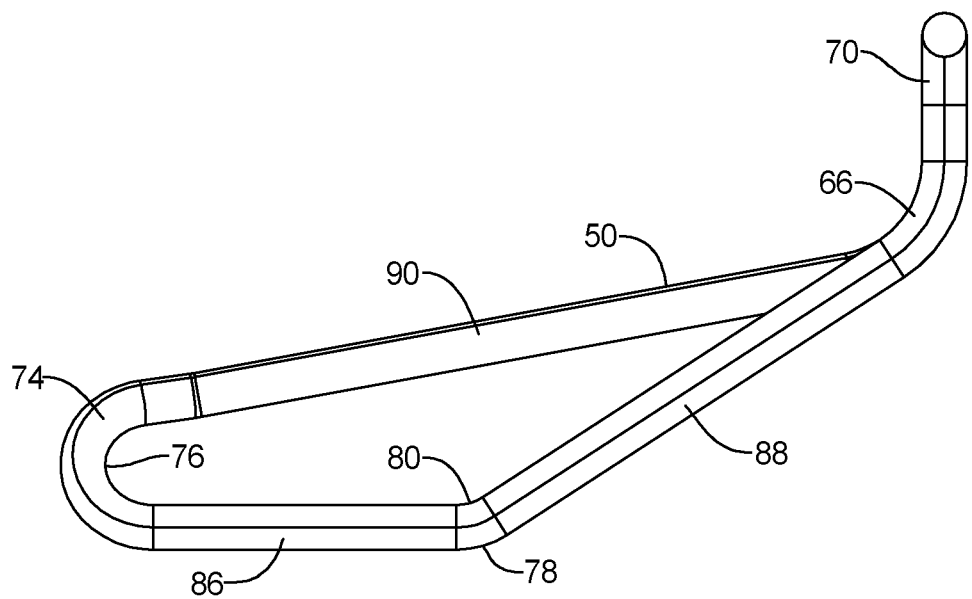
FIGS. 10A-10E are top, front, bottom, right side, and left side views, respectively, of the left hand or driver side energy management loop.
Figure 11A:
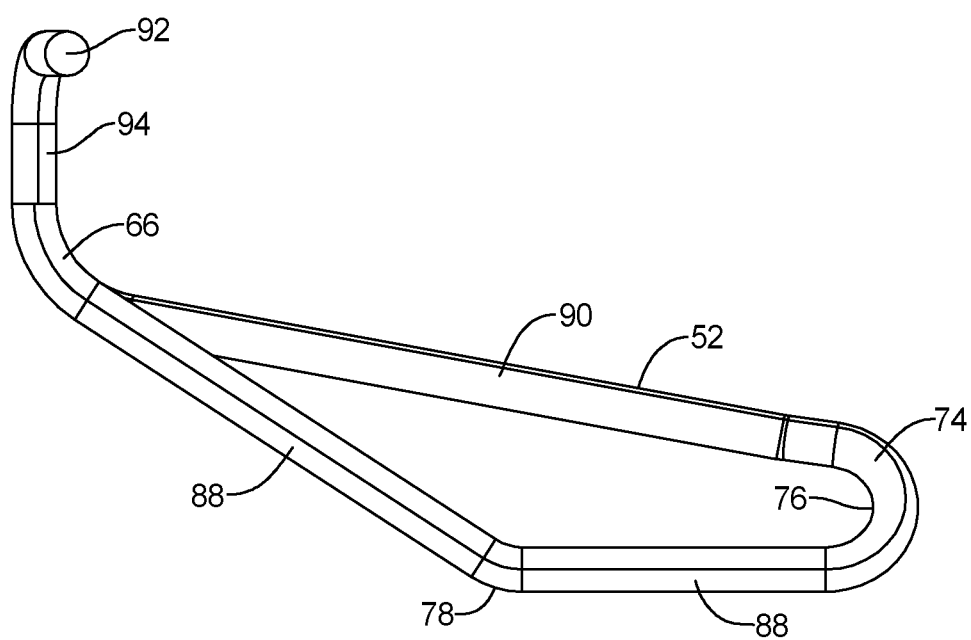
Figure 10B:
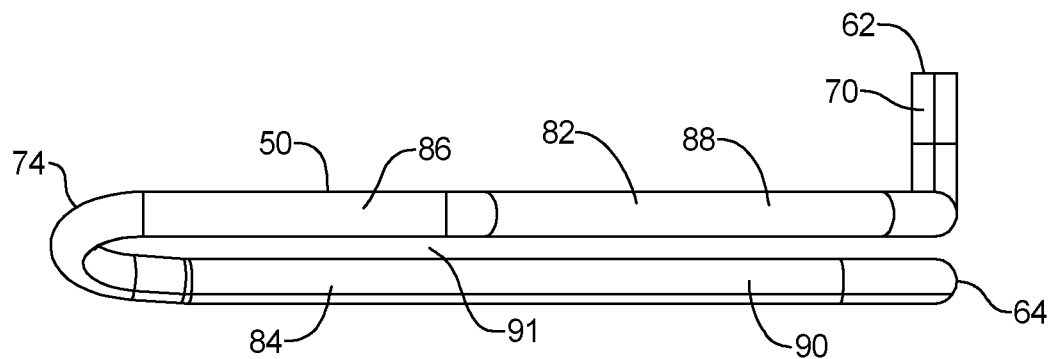
Figure 11B:
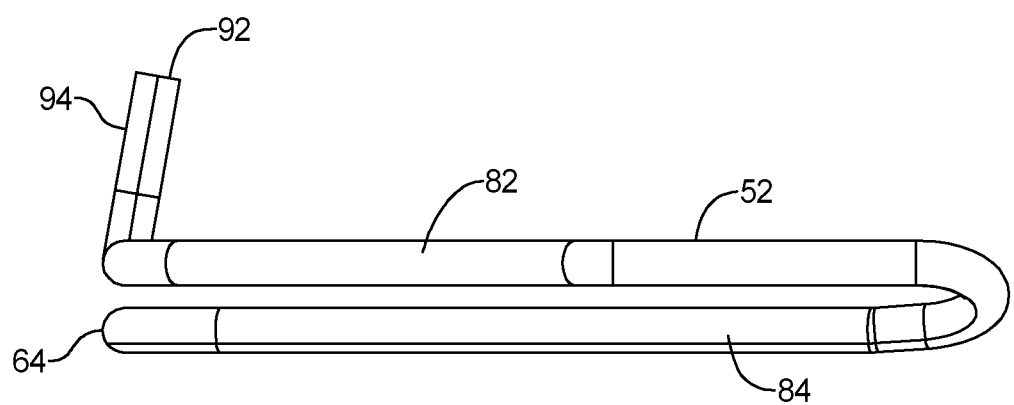
Figure 10C:
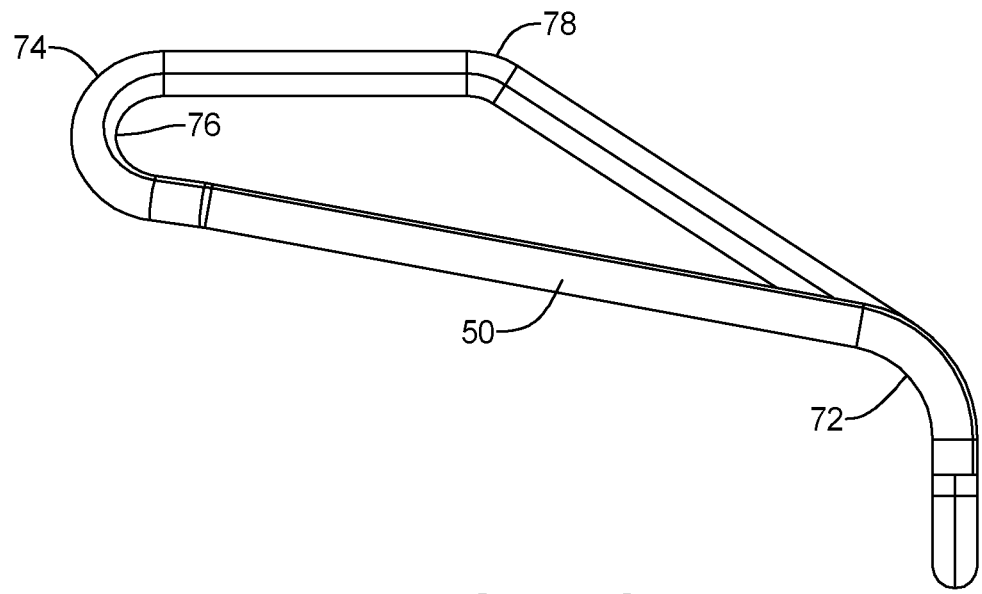
Figure 11C:
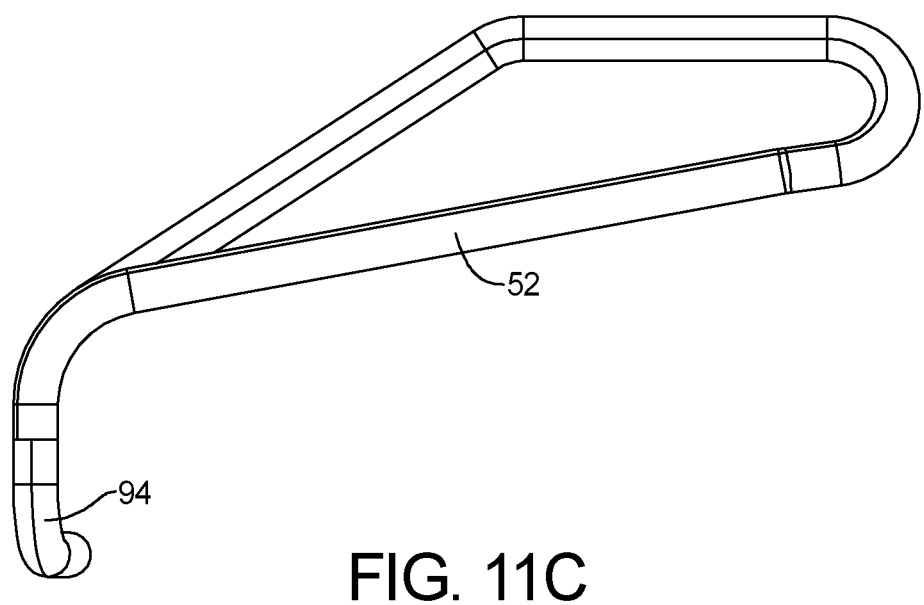

As illustrated in FIG. 10B, the wire loop 50 extends from a first end 62 to a second end 64. Each of the ends 62 and 64 are wrapped around a portion of a spacer guide 48 and TIG welded to the spacer 48, further discussed herein. The first end 62 includes a first radius 66 having a radius of about 13 mm that mates with the groove portion 58 of a spacer 48, as illustrated in FIG. 4. The first radius 66 extends along a plane and a second radius 68 extends along a plane that is substantially orthogonal to the plane of the first radius 66 to define an anti-rotation finger 70. The second end 64 includes a third radius 72, again, of about 13 mm that extends along a plane that is parallel to the plane of the first radius 66 and is configured to be welded to a second spacer guide 48 (see FIG. 12B).

Figure 14:
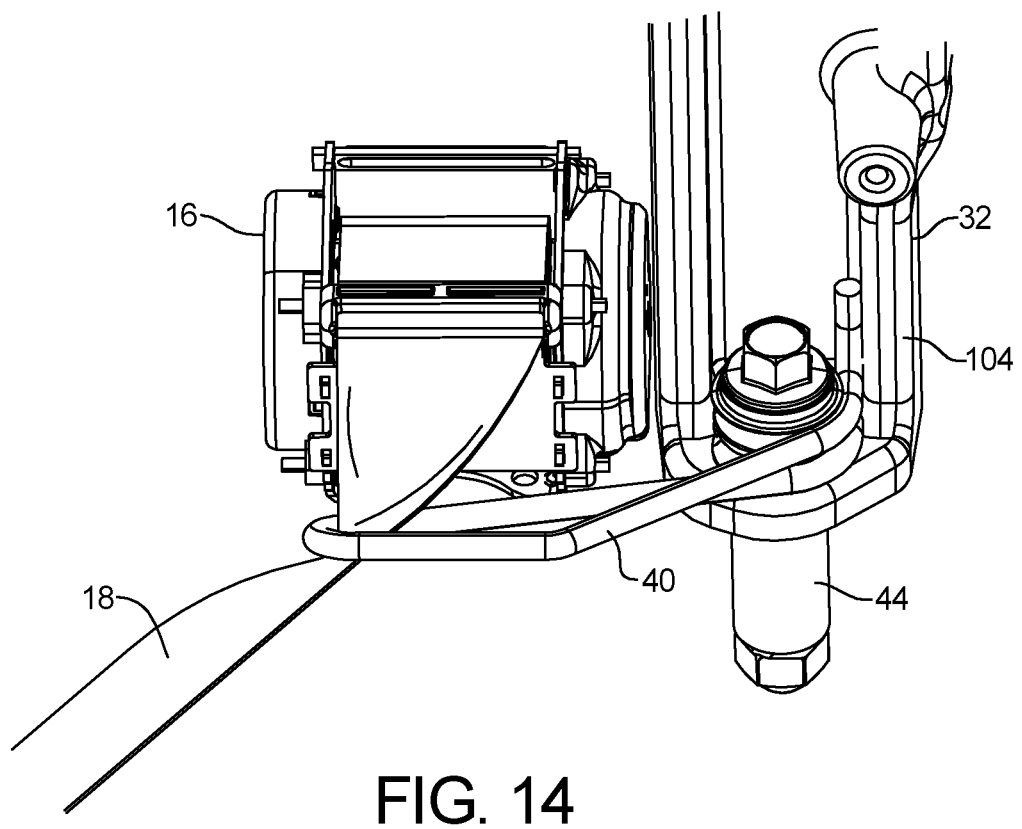
FIG. 14 is a front view of the seat belt in a folded condition with the passenger side energy management loop.

Positioned opposite the first and second ends 62 and 64 is a seat belt support end or portion 74. The seat belt support portion 74 includes a radius 76 of about 6.83 mm. This fourth radius 76 of the seat belt support portion 74 is shaped to prevent fraying or cutting of the seat belt 80 but allows "dumping" of the belt or folding of the belt, as illustrated in FIG. 14 and further discussed herein. Positioned between the seat belt support portion 74 and the first and second ends 62 and 64 is a seat belt guide portion 78 having a radius 80 of about 6.83 mm. The distance between the seat belt support portion 74 and the seat belt guide portion 78 is about 44 mm to slidably accommodate a 43 mm wide seat belt 18 along the surface 88 between these areas. This allows easy retraction and extension of the seat belt with the retractor 16 along the surface without increasing further retraction force. This also allows the seat belt 18 to ride slightly into the radius in order to make the folding of the seat belt 18 more consistent and predictable.

Figure 10D:
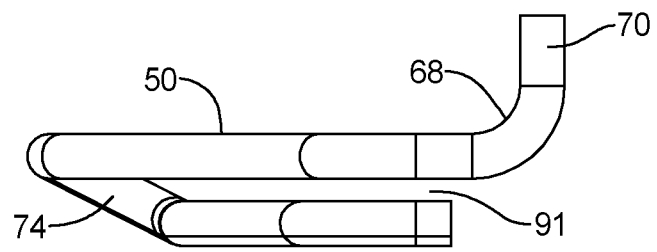
Figure 11D:
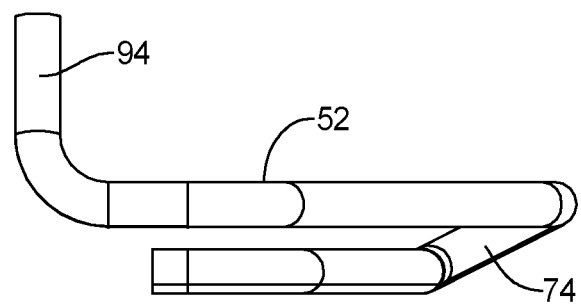
Figure 10E:
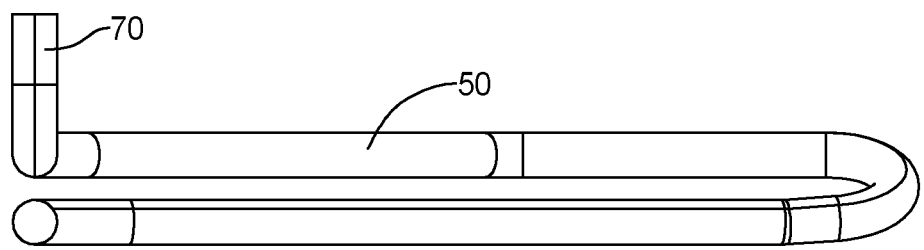
Figure 11E:
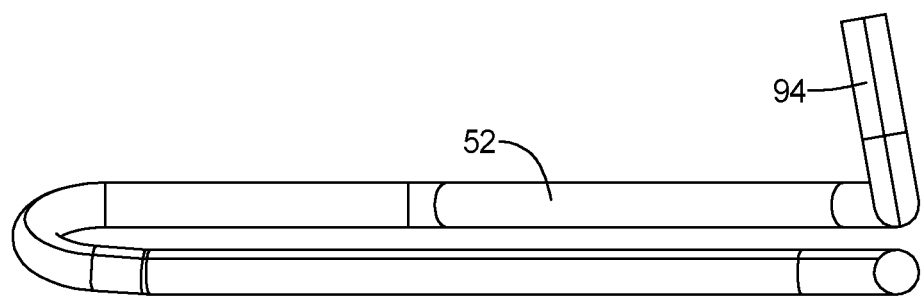

Referring to FIG. 10B, the driver wire loop 50 includes a first or upper portion 82 and a second or lower portion 84. The first portion 82 is formed by a first segment 86 between the seat belt support end 74 and the seat belt guide portion 78. The upper portion 82 also includes a second straight segment 88 between the seat belt guide portion 78 and the first end 62. The lower portion 84 includes one straight segment 90 between the seat belt support end 74 and the second end 64. The first segment 86, the second segment 88, and the third segment 90 from a top view, as illustrated in FIG. 10A, forms a substantially triangular configuration that is configured to slidably support the seat belt 18 along the first segment 86, as well as provide for off-axis lateral load support to the seat belt 18 and retractor 16 without interfering with normal operation of the seat belt 18 relative to the retractor 16. As illustrated in FIGS. 10B and 10D, the seat belt support end 74 includes the radius 76, as well as angles the first and second segments 86 and 88 on a plane defined by the upper section 82 to the third segment 90 on the lower portion 84. Such a configuration defines a gap 91 between the upper portion 82 and the lower portion 84, further discussed herein.

The passenger wire loop 52 is a substantial mirror image of the driver wire loop 50 and like reference numerals will be used to identify like structures. Only differences in structures between driver wire loop 50 and the passenger wire loop 52 will be discussed herein understanding that the remaining structures are substantially similar or the same. The passenger wire loop 52 includes a first end 92 and the second end 64. The first end 92 includes the radius 66 along the noted plane. Extending from the radius 66 at the first end 92 is an anti-rotation finger 94 that extends at an angle 80° relative to the plane of radius 66. The anti-rotation finger 94 is angled as compared to the anti-rotation finger 70 based upon the direction of threading and tightening of the fastener 44, further discussed herein. The remaining portions of the passenger wire loop 52 are the same as the driver passenger wire loop 50.

Turning now to FIGS. 12A-12C and 13A-13C, the energy management loop 40 for the driver side restraint system 12A and the passenger side restraint system 12B is illustrated, respectively. In this regard, in FIGS. 12A-12C, the driver wire loop 50 is illustrated welded to a pair of spacer guides 48. As illustrated in FIGS. 12B and 12C, the gap 91 is illustrated that extends from the first and second ends 62 of the wire loop 50 toward the end 74. The gap 91 enables the energy management loop 40 to be easily slid over the seat belt 18 in order to assemble and attach the energy management loop 40 to the chassis 12 of vehicle 10. As illustrated in FIG. 12A, each spacer 48 is TIG welded to each corresponding end 62 and 64 about a 90° portion of spacer 48, as illustrated. Specifically, the portion 96 can be slightly greater than 90° and about 116°, as shown in FIG. 12A. This allows for a minimum weld length of 20 mm, which corresponds to a range for portion 96 being about 70° to 116°. The assembly of the energy management loop 40 for the passenger side is also illustrated in FIGS. 13A-13C and is similarly attached to the pair of spacers 48.

Figure 3:
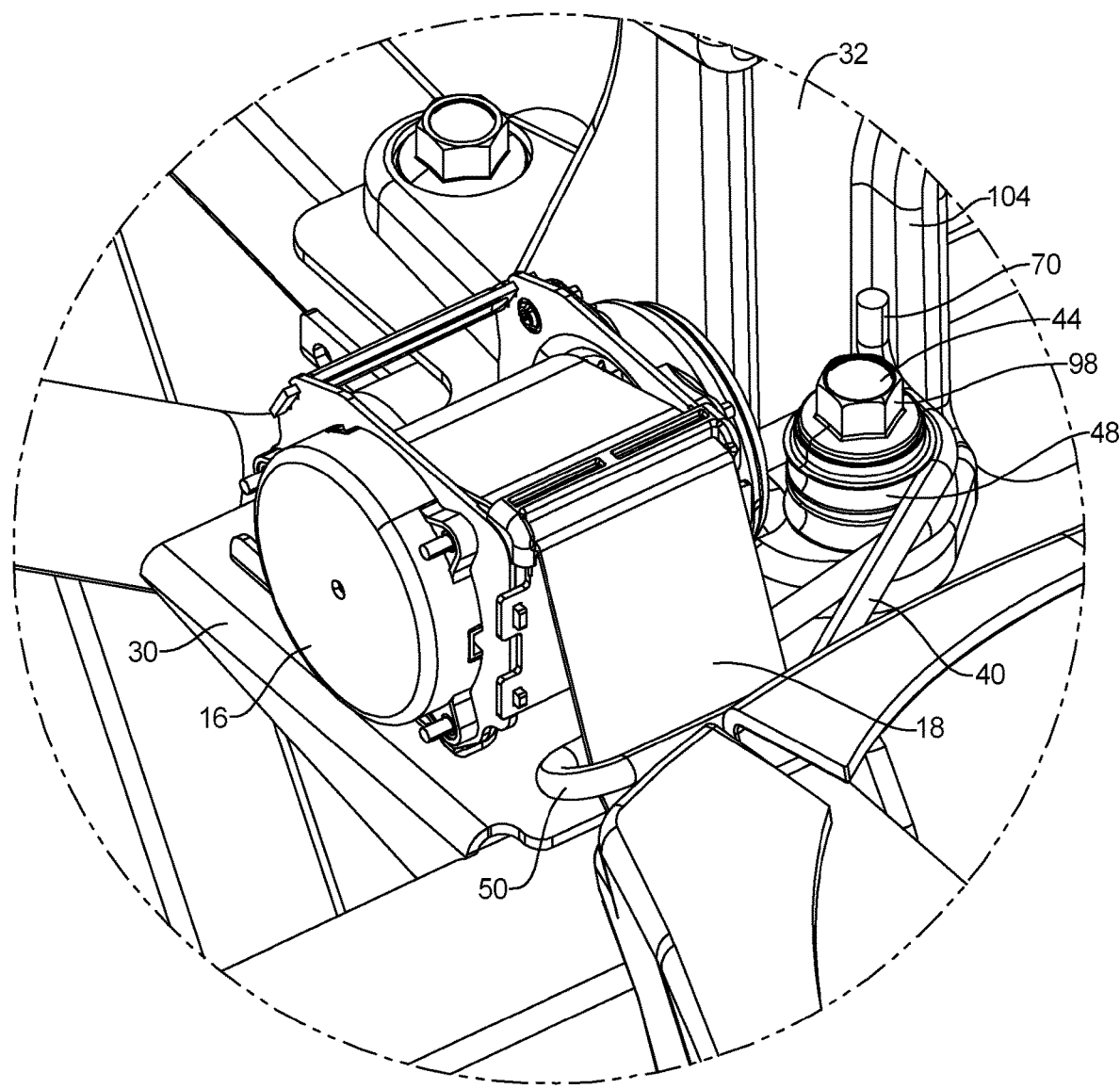
FIG. 3 is a perspective view of a retractor and the energy management loop affixed to the chassis.
Figure 8:
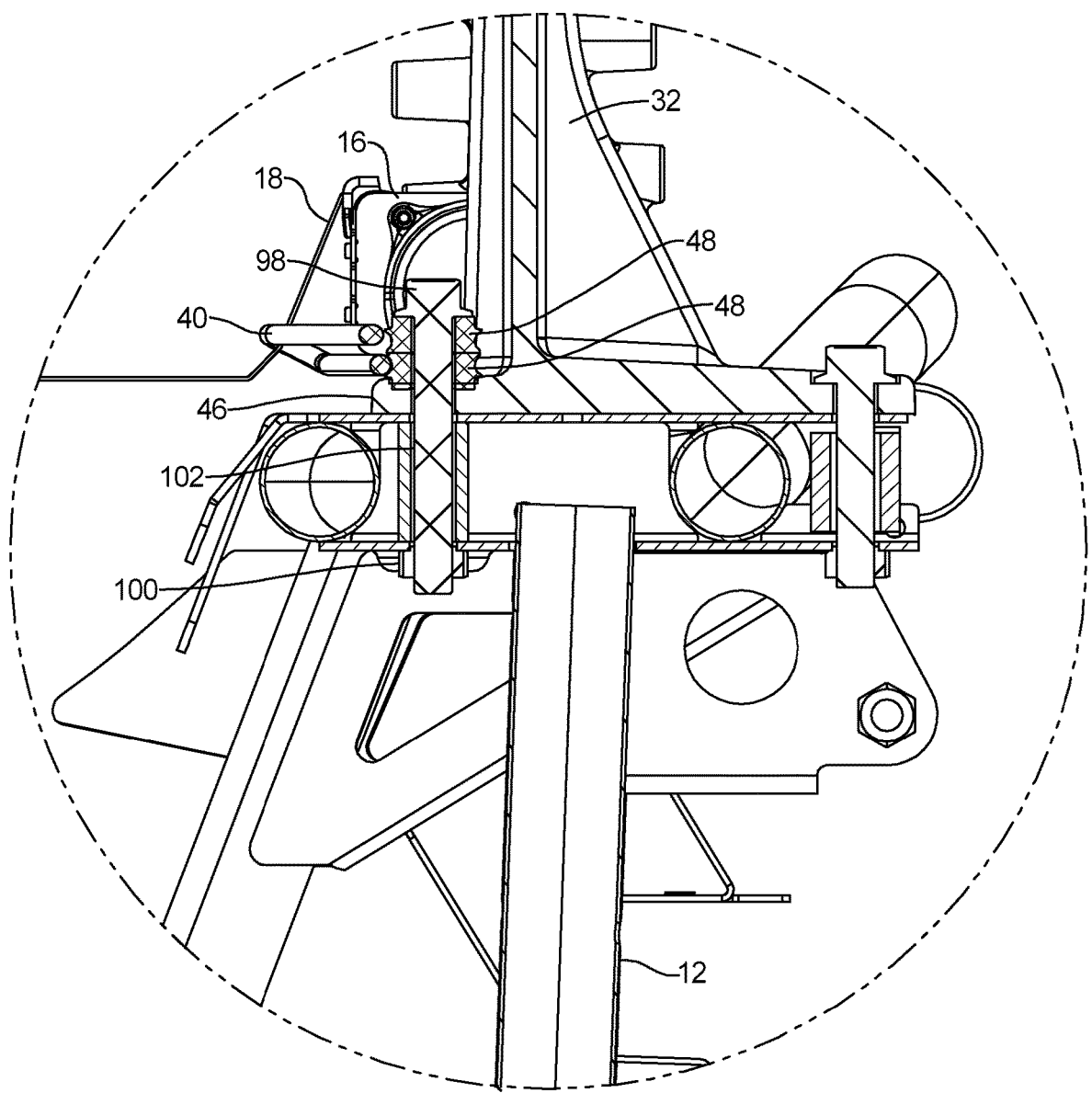
FIG. 8 is a side cross-sectional view illustrating the energy management loop and the retainer bolt.

Referring now to FIGS. 3, 4, and 8, the energy management loop 40 attached relative to the chassis 12 of the vehicle 10 will be further discussed in relation to the mounting of the energy management loop 40. In this regard, the energy management loop 40 is mounted to the chassis 12 by way of the fastener 44. The fastener 44, as illustrated in FIG. 8, is formed of an elongated bolt 98 and nut 100 that passes through the roll hoop mount 46. The bolt 98 is an M12 bolt and is passed through a bore 102, as illustrated in FIG. 8. As illustrated in FIG. 4, the anti-rotation finger 70 is shown positioned and captured within the roll bar 32. Specifically, the roll bar 32 is formed from a 6061-T6 forged aluminum and includes a flange 104 in which the anti-rotation finger 70 is captured or rests against. Such a configuration prevents the wire management loop 40 from rotating as the fastener 44 is tightened, as well as under load. The anti-rotation finger 70 also provides load sharing for the driver wire loop 50 thereby sharing the welding loads where the wire loop 50 is welded to the spacers 48 and, thus, increasing the strength of the welds to reduce weld failure. The passenger wire loop 52 is similarly secured and held within the roll bar 32, via the flange 104, by way of its anti-rotation finger 94 that is slightly angled, as illustrated in FIGS. 11A-11D, to account for the thread rotation of bolt 98 during tightening to provide the anti-rotation effect and provide the weld strengthening effect.

In order to install the energy management loop 40, for example, the driver side wire loop 50, the seat belt 18 is slid between the two spacers 48 and into the gap 91, as illustrated in FIG. 12B. Thereafter, the ends 62 and 64 are positioned within the roll bar 32 and adjacent the flange 104. The bolt 98 is passed through bore 54 and the nut 100 is tightened to secure the energy management loop 40 relative to the chassis 12 of the vehicle 10. The energy management loop 40 reduces side loading on the retractor 16 and reduces off-axis loading of the retractor 16 based on transverse loads that can be placed on vehicle 10. The energy management loop 40 is configured to only reduce the transverse loads in one direction and thereby not affect the retractor 16 in its normal operation along axis 38. The seat belt support portion or end 74 has a radius and is shaped to prevent seat belt fraying or cutting and allows free belt movement and retraction in ordinary use. The radius 76 also allows the seat belt to bunch up or fold over, as illustrated in FIG. 14, during lateral loading to reduce lateral force on the seat belt 18 and the retractor 16. During loading, the wire loop 50 can flex to absorb the lateral force and redirect the lateral force away from the retractor 16. In this regard, the triangular wire loop 50 can flex such that portion 78 is moved closer to segment 90 as the triangular wire loop slightly elongates in length during this motion and loading.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat belt energy management loop system, comprising:
    a wire loop extending from a first end to a second end the first end adjacent the second end; and
    a first spacer attached to at least one of the first end or the second end;
    wherein the wire loop has,
        a seat belt support portion positioned opposite the adjacent first and second ends;
        a seat belt guide portion between the seat belt support portion and the adjacent first and second ends; and
        a first seat belt guide wire segment between the seat belt support portion and the seat belt guide portion.

2. The seat belt energy management loop system of claim 1, wherein the seat belt support portion extends about a radius between the range of 6.03 millimeters to 7.63 millimeters.

3. The seat belt energy management loop system of claim 1, further comprising a seat belt retractor, a seat belt and a seat belt latch assembly.

4. The seat belt energy management loop system of claim 3, wherein the wire loop is secured to the retractor to reduce off-axis loading on the retractor.

5. The seat belt energy management loop system of claim 1, wherein the wire loop is formed from 1018 steel having a diameter of ¼ inch.

6. A seat belt energy management loop system, comprising:
    a wire loop extending from a first end to a second end; and
    a first spacer attached to the first end;
    a second spacer attached to the second end;
    wherein a gap is defined between the first spacer and the second spacer to enable a seat belt to be positioned within the wire loop;
    wherein the wire loop has,
        a seat belt support portion opposite the first and second ends;
        a seat belt guide portion between the seat belt support portion and the first and second ends; and
        a first seat belt guide wire segment between the seat belt support portion and the seat belt guide portion.

7. The seat belt energy management loop system of claim 6, further comprising a fastener configured to pass through the first and second spacers and configured to attach the wire loop to a vehicle.

8. The seat belt energy management loop system of claim 6, wherein the first spacer is welded to the first end of the wire loop and the second spacer is welded to the second end of the wire loop, wherein the first spacer and second spacer are positioned substantially parallel to one another to define the gap there between for receipt of the seat belt there through.

9. A seat belt energy management loop system, comprising:
   a wire loop extending from a first end to a second end; and
   a first spacer attached to at least one of the first end or the second end;
   wherein the wire loop has,
      a seatbelt support portion opposite the first and second ends;
      a seat belt guide portion between the seat belt support portion and the first and second ends; and
      a first seat belt guide wire segment between the seat belt support portion and the seat belt guide portion;
   wherein the wire loop includes the first seat belt guide wire segment, a second wire segment, and a third wire segment to define a substantially triangular shaped wire loop.

10. A seat belt energy management loop system, comprising:
   a wire loop extending from a first end to a second end; and
   a first spacer attached to the at least one of the first end or the second end;
   wherein the wire loop has,
      a seat belt support portion opposite the first and second ends;
      a seat belt guide portion between the seat belt support portion and the first and second ends; and
      a first seat belt guide wire segment between the seat belt support portion and the seat belt guide portion;
   wherein the wire loop further includes an anti-rotation finger configured to inhibit rotation of the wire loop relative to a fixation point.

11. A seat belt energy management loop system, comprising:
   a triangularly shaped wire loop having a first end and a second end, the first end adjacent to the second end;
   a first spacer attached to the first end of the wire loop;
   a second spacer attached to the second end of the wire loop; and
   a fastener configured to pass through the first spacer and the second spacer and configured to attach the wire loop to a vehicle to reduce off-axis loading on a seat belt retractor.

12. The seat belt energy management loop system of claim 11, wherein the triangularly shaped wire loop and the first and second spacers define a gap there between configured to receive a seat belt within the triangularly shaped wire loop.

13. The seat belt energy management loop system of claim 11, wherein the first end of the triangularly shaped wire loop includes an anti-rotation finger to prevent rotation of the wire loop relative to the vehicle.

14. The seat belt energy management loop system of claim 11, wherein the triangularly shaped wire loop includes a first wire segment, a second wire segment and a third wire segment configured to form a triangular shape where the first wire segment provides for a seat belt guide surface.

15. The seat belt energy management loop system of claim 11, wherein the first spacer is an annular member having an outer groove formed into a side wall of the annular member configured to receive a portion of the first end of the wire loop therein.

16. The seat belt energy management loop system of claim 15, wherein the portion of the first end of the wire loop is welded to a portion of the groove formed in the side wall of the annular member.

17. The seat belt energy management loop system of claim 11, wherein the triangularly shaped wire loop includes a seat belt support portion opposite the first and second ends of the wire loop having a radius to enable a seat belt to fold within the radius.

18. A seat belt energy management loop system, comprising:
   a triangularly shaped wire loop having a first end and an adjacent second end, the first end positioned adjacent to the second end to define a gap between the first end and the second end, the triangularly shaped wire loop shaped to include a first wire segment, a second wire segment, and a third wire segment, the first wire segment forming a seat belt guide surface;
   a first annular spacer attached to the first end of the wire loop;
   a second annular spacer attached to the second end of the wire loop; and
   a fastener configured to pass through the first and second annular spacers and configured to attach the wire loop to a vehicle to reduce off-axis loading on a seat belt retractor.

19. The seat belt energy management loop system of claim 18, wherein the fastener is a threaded nut and bolt.

20. The seat belt energy management loop system of claim 18, further comprising the seat belt retractor having a seat belt configured to pass through the gap and be positioned within the triangularly shaped wire loop, and a seat belt latch to latch the seat belt in an open and closed configuration.

* * * * *